United States Patent Office 2,984,561
Patented May 16, 1961

2,984,561

METHOD OF ROASTING PYRITES

Allen C. Amdur, Hanover Township, Morris County, and Curtis B. Hayworth, Morristown, N.J., assignors to Allied Chemical Corporation, New York, N.Y., a corporation of New York No Drawing. Filed Apr. 15, 1960, Ser. No. 22,411

2 Claims. (Cl. 75—9)

This invention relates to powdered iron and more particularly refers to a new and improved method for beneficiation of roasted pyrites adapted for reduction to powdered iron. Powdered iron is used in industry for molding but has been limited in extent of use due to its high cost. The specifications for powdered iron require it to be in finely divided particle size and also of high purity, including a sulfur content of less than 0.10%, which requirements necessitate an extensive preparation.

Commercially, iron pyrites are roasted by passing air or oxygen-containing gas in contact with finely divided particles of pyrites to reduce the iron sulfide to iron oxide and concomitantly produce the desired $SO_2$ product which is subsequently usually converted to sulfuric acid. The resultant roasted pyrites, often termed pyrites cinder, is essentially a waste product due to the presence of impurities, particularly sulfur, and while some pyrites are commingled with ore in steel-making plants the quantity which can be used therefor and the price paid for it are low.

Pyrites cinder is in finely divided particle form and requires no further grinding or comminution to adapt it for use as powdered iron. Unfortunately despite the drastic roasting of the pyrites cinder with air, the cinder contains about 1-3% sulfur which, of course, makes it unsuitable for use in the production of powdered iron. The problem is to remove sulfur from pyrites cinder to a level of less than 0.1% sulfur, leaving the cinder in its finely divided state, i.e. without loss of its particulate identity. Sulfur removal in the past has been accomplished by mixing the cinder with coal and sending the mass through a sintering machine where the coal is burned off and the sulfur simultaneously removed. The product is a sintered mass in which the individual particles are stuck together and comminution of the sintered mass into finely divided particles suitable for use in the production of powdered iron is impractical.

An object of the present invention is to provide a method for reducing the sulfur content of finely divided particles of roasted pyrites to a value of less than 0.10% without loss of particulate identity. Other objects and advantages will be apparent from the following description.

In accordance with the present invention finely divided particles of roasted pyrites containing up to 5% sulfur, more generally about 1-3% by weight sulfur, may be reduced in sulfur content to a value of less than 0.1% sulfur by passing a stream of gas containing hydrogen fluoride and oxygen, preferably a mixture of gaseous HF and air, said gas containing 5-50%, preferably 10-25%, by volume HF and 10-50%, preferably 10-30%, by volume oxygen in contact with the roasted pyrites under conditions to effect suspension and agitation of the particles of roasted pyrites in the gas stream to assure intimate contact between the gas and the roasted particles at a temperature within the range of about 700° F. to below the fusion point of the roasted pyrites, preferably at a temperature between 900–1600° F., for a sufficient length of time to effect reduction of the sulfur content in the roasted pyrites to a level of less than 0.1% sulfur and separating roasted pyrites substantially free from sulfur from the gas.

The roasting of iron pyrites and particularly finely divided pyrites termed concentrate is commonly accomplished in a fluidized bed or by flash roasting and generally involves oxidizing pyrites with oxygen, usually air, under drastic conditions of temperature, usually above 1800° F. Despite the severe oxidation conditions to which the pyrites have been subjected, sulfur cannot be substantially completely removed and the sulfur content in the resultant cinder is of the order of 1–3%. We found that we could achieve substantially complete removal of the residual sulfur in the cinder by subjecting the cinder to a fluidized bed operation similar to that to which cinder had previously been subjected in the roasting of pyrites providing we admixed a small amount of gaseous hydrogen fluoride, about 10–25% by volume, with the fluidizing air. Indeed, the presence of gaseous hydrogen fluoride is so effective that substantially complete sulfur removal is accomplished at temperatures well below the temperature at which the pyrites were previously roasted. In practice, the pyrites cinder are disposed in a bed supported on a permeable member in a column with a mixture of air or oxygen-containing gas and hydrogen fluoride passing up through the column to maintain the bed in a fluidized state. Heat to maintain the temperature of the fluidized bed may be provided by preheating the entering gases and the cinder or by externally heating the column or both. In practice, a temperature of about 1300–1500° F. gives good results. The velocity of the gases passing up through the bed of cinder should be sufficiently high to maintain the bed in the fluidized condition; ordinarily a velocity of around one-half foot per second to about two feet per second will be adequate. The time required for removal of the sulfur from the cinder to a value below 0.1% will vary depending on the sulfur content of the cinder, in general effective reduction of the sulfur content has been accomplished in 2–5 hours. We have been unable to explain why the presence of hydrogen fluoride stimulates the reaction so that substantially complete desulfurization of cinder is effected at low temperatures, appreciably lower than that to which the cinder had previously been subjected, except to presume that the hydrofluoric acid acts in the nature of a catalyst. Of particular importance, the resultant cinder retains its particulate identity, that is, it does not form any clusters or agglomerates as was required by the prior art method of removing sulfur.

Although purification of the cinder is described employing a fluidized bed, effective sulfur removal may also be accomplished by introducing particles of cinder in a flowing stream of a gas mixture of hydrogen fluoride and oxygen wherein the particles are dispersed and agitated in the gas stream to effect intimate contact therewith until sulfur removal has been accomplished. In practice, a stream of such gas may be circulated in a closed circuit with introduction of particles of cinder in the circuit wherein the particles of cinder are suspended and carried by the stream of gas. Suspension, dispersion and agitation of the particles of cinder in the gas stream was found necessary to accomplish the desired results as contrasted to static bed operation which caused incomplete and inefficient sulfur removal.

Reduction of the purified pyrites cinder may be accomplished by passing hydrogen gas in contact with the cinder at an elevated temperature of the order of 800–1500° F. until the iron oxide is converted to iron. A convenient method of effecting reduction of the cinder is by fluidization wherein a bed of cinder supported on a permeable member in a column is maintained in the fluidized state at an elevated temperature by the passage of hydrogen gas up through the bed at a velocity sufficient to maintain the bed in fluidized condition, usually about 0.5–2 feet per second, for a sufficient length of time, about three to six hours, to convert the iron oxide particles to iron. The resultant product is powdered iron suitable for molding.

The following example illustrates the present invention.

The charge material was roasted pyrites (calcines) which had previously been subjected to high temperature roasting with air. The charge material contained 1.43% sulfur and had a particle size distribution as follows:

| | Wt. percent |
|---|---|
| On Tyler Screen No. 100 | 4.1 |
| On Tyler Screen No. 200 | 32.8 |
| On Tyler Screen No. 325 | 23.0 |
| 30 microns to 325 mesh | 25.4 |
| 20–30 microns | 10.1 |
| 10–20 microns | 3.7 |
| 5–10 microns | .5 |
| 0–5 microns | .4 |

The roasted pyrites were charged into a stainless steel column provided with external heating means and disposed in the column in a bed on a gas distributor plate. A preheater was provided for heating the fluidizing gas prior to its entrance into the column beneath the gas distributor plate. Gases passing through the bed of cinder were released from the top of the column. Preheated fluidizing gas consisting of a mixture of 17% HF and 83% air was introduced into the bottom of the externally heated column passing up through the gas distributor plates, through the bed of cinder maintained at a temperature of 1510–1530° F. at a velocity of about 0.5 foot per second. The flow of gas continued for four hours at which time the HF feed and the heat were turned off. The air flow was maintained until the temperature dropped to about 200° F. and the cinder removed from the column and analyzed. The sulfur content of the cinder was reduced to 0.09% by weight. Also of particular importance, there was no loss of particulate identity of the cinder particles.

The purified cinder was then reduced with hydrogen gas in a fluidized bed maintained at a temperature of 900° F. and a pressure of 50 p.s.i.g. for a period of six hours. The resultant product was eminently suitable as powdered iron for molding.

Although certain preferred embodiments of the invention have been disclosed for purpose of illustration, it will be evident that various changes and modifications may be made therein without departing from the scope and spirit of the invention.

We claim:

1. A process of reducing the sulfur content of finely divided particles of roasted pyrites containing about 1–5% sulfur to a value of less than 0.1% sulfur without loss of particulate identity which comprises passing a stream of gas containing 5–50% by volume hydrogen fluoride and 10–50% by volume oxygen in contact with the finely divided particles of roasted pyrites to effect suspension and agitation of the particles of roasted pyrites in the gas stream to assure intimate contact between the gas and the roasted particles at a temperature within the range of about 700° F. to below the fusion of the roasted pyrites for a sufficient length of time to effect reduction of the sulfur content in the roasted pyrites to a level of less than 0.1% sulfur and separating the roasted pyrites substantially free from sulfur and without loss of particulate identity from the gas.

2. A process of reducing the sulfur content of finely divided particles of roasted pyrites containing about 1–5% sulfur to a value of less than 0.1% sulfur without loss of particulate identity which comprises passing a stream of gas containing 10–25% by volume hydrogen fluoride and 10–30% by volume oxygen in contact with the finely divided particles of roasted pyrites to effect suspension and agitation of the particles of roasted pyrites in the gas stream to assure intimate contact between the gas and the roasted particles at a temperature within the range of 900–1600° F. for a sufficient length of time to effect reduction of the sulfur content in the roasted pyrites to a level of less than 0.1% sulfur and separating the roasted pyrites substantially free from sulfur and without loss of particulate identity from the gas.

No references cited.